United States Patent
Han et al.

(10) Patent No.: US 10,084,193 B2
(45) Date of Patent: Sep. 25, 2018

(54) DEVICE FOR PREVENTING OVER PRESSURE OF COOLING SYSTEM OF FUEL CELL SYSTEM

(71) Applicant: Hyundai Motor Company, Seoul (KR)

(72) Inventors: Su Dong Han, Gyeonggi-Do (KR); Hyung Kook Kim, Gyeonggi-Do (KR); Hun Woo Park, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 888 days.

(21) Appl. No.: 14/562,721

(22) Filed: Dec. 7, 2014

(65) Prior Publication Data
US 2016/0056517 A1 Feb. 25, 2016

(30) Foreign Application Priority Data

Aug. 25, 2014 (KR) .................. 10-2014-0110588

(51) Int. Cl.
*H01M 10/6568* (2014.01)
*H01M 8/04029* (2016.01)
*H01M 8/0432* (2016.01)
*H01M 8/04746* (2016.01)
*B60L 11/18* (2006.01)

(52) U.S. Cl.
CPC ..... *H01M 8/04029* (2013.01); *B60L 11/1892* (2013.01); *H01M 8/04358* (2013.01); *H01M 8/04768* (2013.01); *H01M 2250/20* (2013.01); *Y02T 90/32* (2013.01); *Y02T 90/34* (2013.01)

(58) Field of Classification Search
CPC ........... B60L 11/1892; H01M 2250/20; H01M 8/04029; H01M 8/04358; H01M 8/04768; Y02T 90/32; Y02T 90/34
See application file for complete search history.

(56) References Cited

U.S. PATENT DOCUMENTS

| | | | | |
|---|---|---|---|---|
| 2001/0019789 | A1* | 9/2001 | Hirakata | H01M 8/04029 429/434 |
| 2007/0141421 | A1* | 6/2007 | Hobmeyr | H01M 8/04014 429/436 |
| 2009/0269638 | A1* | 10/2009 | Hobmeyr | F16K 17/04 429/513 |

FOREIGN PATENT DOCUMENTS

| | | |
|---|---|---|
| JP | 2001-227671 A | 8/2001 |
| JP | 2010-140678 A | 6/2010 |
| KR | 10-2010-0049662 A | 5/2010 |
| KR | 10-2011-0045290 A | 5/2011 |
| KR | 10-2011-0138819 A | 12/2011 |

(Continued)

*Primary Examiner* — Lingwen R Zeng
(74) *Attorney, Agent, or Firm* — Mintz Levin Cohn Ferris Glovsky and Popeo, P.C.; Peter F. Corless

(57) ABSTRACT

A device for preventing over pressure of a cooling system of a fuel cell system is provided. The device detects a change in a temperature of a coolant discharged from a fuel cell stack and prevents over pressure of the cooling system before pressure of the coolant is elevated by the increase in the temperature. In particular, a coolant pump circulates a coolant to a fuel cell stack, a radiator radiates heat absorbed in the coolant, and a temperature sensor detects a temperature of the coolant discharged from the fuel cell stack the device. The system further includes an electronic valve mounted in a pillar neck of the radiator connected with a reservoir for supplementing a coolant to open and close the pillar neck and a fuel cell controller that operates the electronic valve based on a signal of the temperature sensor.

9 Claims, 3 Drawing Sheets

< Open >

< Close >

(56) References Cited

FOREIGN PATENT DOCUMENTS

KR  10-2013-0124789 A  11/2013
KR  10-2014-0013535 A  2/2014

* cited by examiner

< Open >     < Close >

DEVICE FOR PREVENTING OVER PRESSURE OF COOLING SYSTEM OF FUEL CELL SYSTEM

CROSS-REFERENCE TO RELATED APPLICATION

This application claims under 35 U.S.C. § 119(a) the benefit of Korean Patent Application No. 10-2014-0110588 filed on Aug. 25, 2014, the entire contents of which are incorporated herein by reference.

TECHNICAL FIELD

The present invention relates to a device for preventing over pressure of a cooling system of a fuel cell system. In particular, the device for preventing over pressure of a cooling system of a fuel cell system may detect a change in a temperature of a coolant discharged from a fuel cell stack and prevent over pressure of the cooling system before pressure of the coolant is elevated by the increase in the temperature.

BACKGROUND

In general, a fuel cell system mounted in a fuel cell vehicle performs a pressurization operation to control an operative pressure of each fluid to improve an output of a fuel cell.

Typically, the fuel cell stack may be in a form in which a plurality of fuel cells is stacked and sealing of each cell is maintained by using several hundreds of gaskets.

When a difference in pressure of each fluid supplied to the cell is equal to or greater than a predetermined level in the fuel cell stack, a sealing may easily deteriorate due to a structure of the fuel cell stack and system operation safety and performance may deteriorate when leakage occurs.

Particularly, in the related art, when a temperature of a cooling system of the fuel cell increases rapidly, pressure at an entrance of the stack may be elevated to an upper limit value by volume expansion of a coolant, such that an output of a fuel cell vehicle may be frequently limited, and further, when pressure of a channel of a coolant is rapidly elevated due to a boundary of a separation plate inside the stack, leakage inside the stack may frequently occur.

Accordingly, the fuel cell system in the related art has been developed to avoid over pressure of a coolant by compulsorily decreasing an operation speed of a pump which circulates the coolant to a fuel cell stack. However, the related art may have disadvantages. For example, the operation speed of the pump may decrease although cooling of the stack is necessary.

Meanwhile, a coolant operative pressure in the fuel cell system in the related art may be determined according to a specification of a pressurizing cap mounted at an upper side of a radiator for radiating heat of the coolant discharged from the stack.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention may provide technical solutions to the above-described technical difficulties in the related and thus, a device for preventing over pressure of a cooling system of a fuel cell system is provided. The device may detect a change in a temperature of a coolant discharged from a fuel cell stack and prevent over pressure of the cooling system before pressure of the coolant is elevated by the increase in the temperature.

In one aspect, the present invention provides a device for preventing over pressure of a cooling system of a fuel cell system which includes a coolant pump for circulating a coolant to a fuel cell stack; a radiator for radiating heat absorbed in the coolant; and a temperature sensor for detecting a temperature of the coolant discharged from the fuel cell stack. In particular, the device may include: an electronic valve mounted in a pillar neck of the radiator connected with a reservoir for supplementing a coolant to open and close the pillar neck; and a fuel cell controller controlling an operation of the electronic valve based on a signal of the temperature sensor.

The electronic valve may include: a valve fixing part fixedly mounted to an upper end of the pillar neck of the radiator; an electronic actuator attached to a lower end of the valve fixing part and operated according to a signal of the fuel cell controller; a valve operating part attached to a lower end of the electronic actuator and moving up and down according to an operation of the electronic actuator to open and close the pillar neck; and a positive pressure spring installed between the valve fixing part and the valve operating part to be contractible and recoverable.

When an increase speed of a temperature of the coolant is equal to or greater than a predetermined value, the fuel cell controller may operate the electronic valve to open the pillar neck of the radiator. Alternatively, when a temperature of the coolant continuously increases for a predetermined time to be equal to or greater than a predetermined value, the fuel cell controller may operate the electronic valve to open the pillar neck of the radiator.

According to an exemplary embodiment of the present invention, the device for preventing over pressure of the cooling system of the fuel cell system may open the pillar neck of the radiator in advance based on a change in a temperature of a coolant before pressure of the coolant is elevated and over pressure is generated in the cooling system to make the coolant move to the reservoir, thereby effectively preventing over pressure of the cooling system and leakage of the stack.

Further provided are vehicles such as automotive vehicles that comprise a device for preventing over pressure of a cooling system of a fuel system as disclosed herein. Also provided are vehicles such as automotive vehicles that comprise a fuel system as disclosed herein.

Other aspects and preferred embodiments of the invention are discussed infra.

BRIEF DESCRIPTION OF THE DRAWINGS

The above and other features of the present invention will now be described in detail with reference to various exemplary embodiments thereof illustrated in the accompanying drawings which are given hereinbelow by way of illustration only, and thus are not limitative of the present invention, and wherein.

Figure 1:
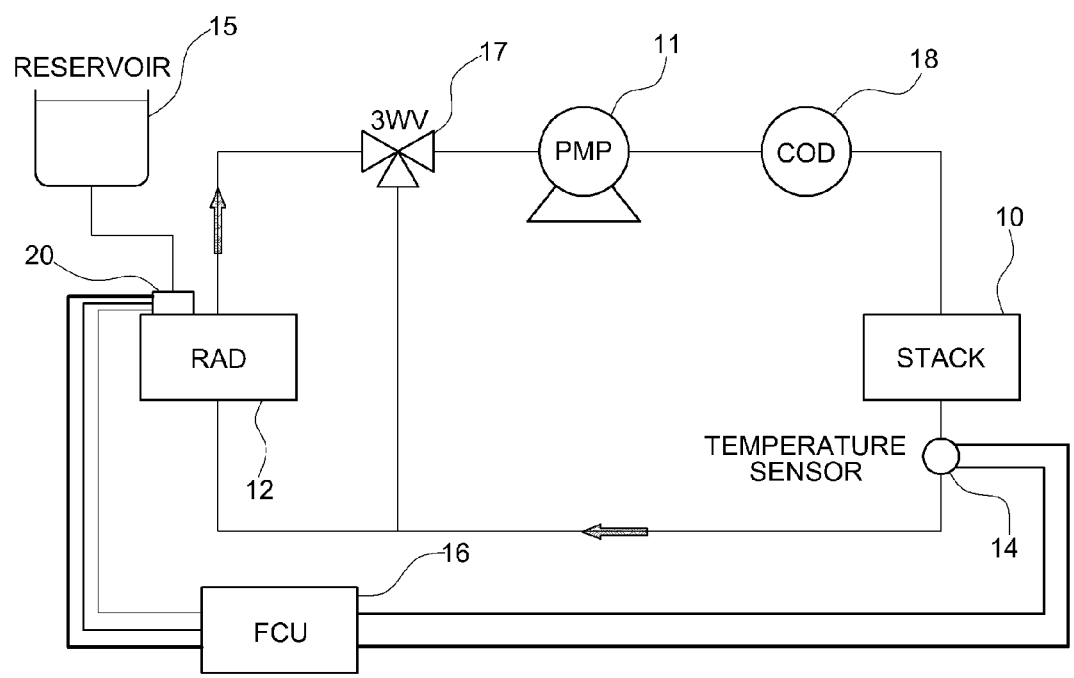
FIG. 1 illustrates an exemplary cooling system of an exemplary fuel cell system according to an exemplary embodiment of the present invention.

Reference numerals set forth in the Drawings includes reference to the following elements as further discussed below

| | |
|---|---|
| 10: fuel cell stack | 11: coolant pump |
| 12: radiator | 13: pillar neck |
| 14: coolant temperature sensor | 15: reservoir |
| 16: fuel cell controller | 17: three-way valve |
| 18: COD heater | 20: electronic valve |
| 21: valve fixing part | 22: electronic actuator |
| 23: valve operating part | 24: positive pressure spring |

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN). The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings so that a person of ordinary skill in the art to which the present invention pertains may easily carry out the exemplary embodiment.

The present invention may effectively prevent over pressure of a cooling system of a fuel cell by opening a pillar neck of a radiator connected with a reservoir through a detection of a change in a temperature of a coolant before pressure of the coolant of a fuel cell system is elevated to an over pressure state.

As shown in FIG. 1, a cooling system of a fuel cell may include: a coolant pump 11 for circulating and providing a coolant to a fuel cell stack 10; a radiator 12 for radiating heat absorbed in a coolant; a coolant temperature sensor 14 for detecting a temperature of a coolant discharged from the fuel cell stack 10; a reservoir for storing a coolant for supplementing a coolant; an electronic valve 20 for opening and closing a pillar neck 13 of a radiator 12 connected with a reservoir 15; and a fuel cell controller 16 for controlling an operation of the electronic valve 20.

Figure 2:
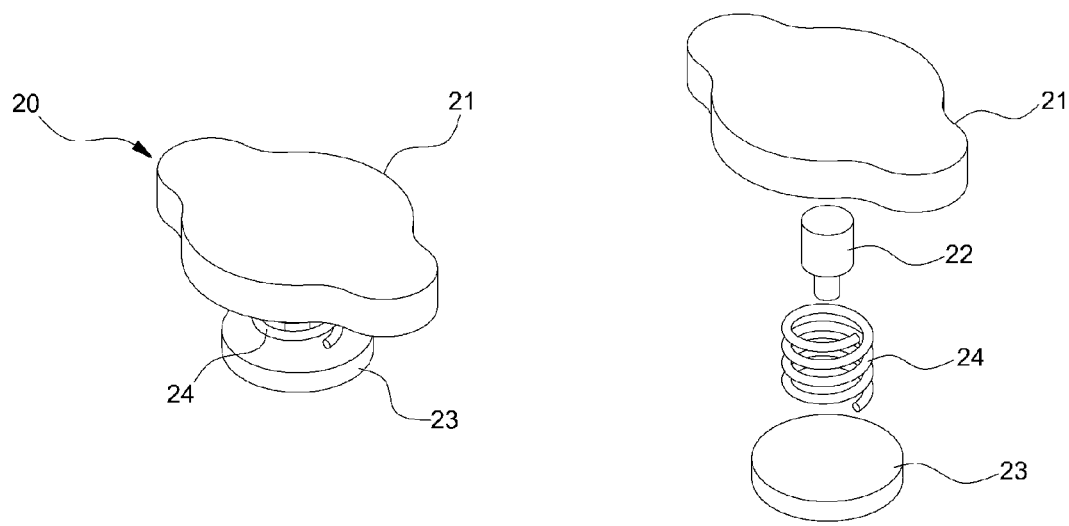
FIG. 2 illustrates an exemplary electronic valve for preventing over pressure of an exemplary cooling system of the fuel cell system according to an exemplary embodiment of the present invention.

As illustrated in FIG. 2, the electronic valve 20 may be in a form mounted with an electronic actuator 22 inside a pressurizing cap for controlling an operative pressure of a coolant and may be mounted in the pillar neck 13 of the radiator 12 connected with the reservoir 15.

Particularly, the electronic valve 20 may include: a valve fixing part 21 fixedly mounted to an upper end of the pillar neck 13 of the radiator 12; the electronic actuator 22 attached to a lower end of the valve fixing part 21 and extended according to a signal of the fuel cell controller 16; a valve operating part 23 attached to a lower end of the electronic actuator 22 and moving up and down according to an extension of the actuator 22; and a positive pressure spring 24 connected between the valve fixing part 12 and the valve operating part 23 to be contractible and recoverable.

Figure 3:
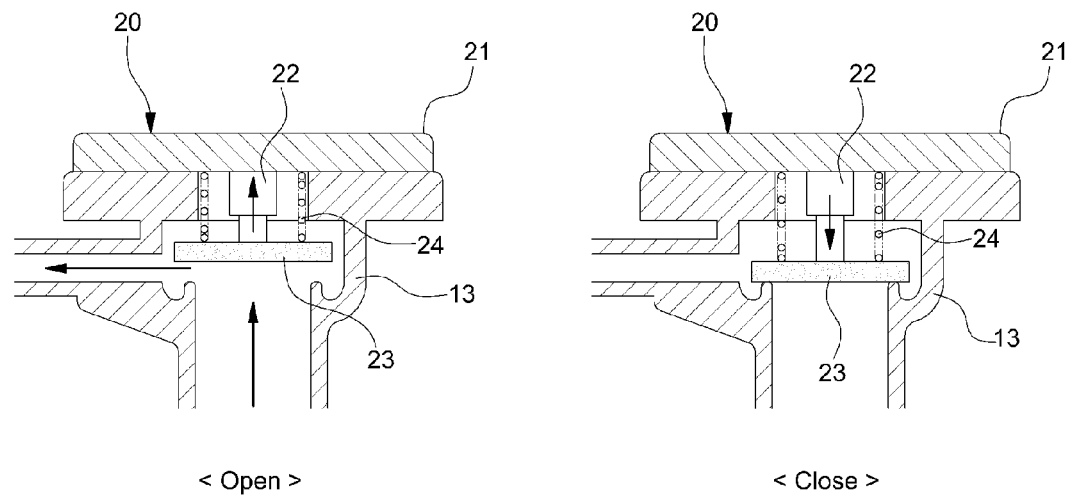
FIG. 3 illustrates an exemplary operation type of an exemplary electronic valve according to an exemplary embodiment of the present invention.

As illustrated in FIG. 3, the valve operating part 23 may open the pillar neck 13 or may open a flow path between the pillar neck 13 and the reservoir 15, when the valve fixing part 21 at the upper side is moved toward by the electronic actuator 22 to make the coolant move to the reservoir 15.

The actuator 22 may operate by a signal of the fuel cell controller 16, such that the electronic valve 20 may open and close the pillar neck 13 of the radiator 12, and when a temperature of the coolant rapidly increases, the electronic valve 20 may open the pillar neck 13 to prevent over pressure of the cooling system by an increase in pressure of the coolant.

When there is no signal of the fuel cell controller 16, the electronic valve 20 may be mechanically operated to serve as a typical pressurizing cap function. In general, an operative pressure of the coolant of the cooling system of the fuel cell may be determined according to a specification of a pressurizing cap mounted in the pillar neck 13 of the radiator 12.

As such, the electronic actuator 22 may be compressible by external pressure such as the pressure of the coolant and may be extended by elastic restoration force of the positive pressure spring 24 to be recoverable.

The fuel cell controller 16 may control an operation of the electronic valve 20 based on a signal of the coolant temperature sensor 14. Particularly, when a speed of an increase in a temperature of the coolant is equal to or greater than a predetermined reference value, the fuel cell controller 16 may not decrease an operation speed of the coolant pump 11, but the fuel cell controller 16 may operate the electronic actuator 22 and lift the valve operating part 23 in an up direction or to the side of the valve fixing part 21 to open the electronic valve 20, such that the coolant may be movable to the reservoir 15 to reduce an increase in pressure of the coolant.

When the fuel cell controller 16 detects a change in an increase factor of pressure of the coolant, the fuel cell controller 16 may open the pillar neck 13 of the radiator 12 by operating the electronic actuator 22 to decrease the pressure of the coolant in advance before the pressure of the coolant is elevated to an over pressure state, thereby preventing over pressure of the coolant system and leakage occurring in the stack.

In particular, the amount of a movement of the valve operating part 23 in the up direction by the electronic actuator 22 may be determined by a coolant temperature increase width or increase amount of the coolant temperature and a temperature increase speed. In other words, the amount of opening of the electronic valve 20 may be determined based on an increase width and an increase speed of the temperature of the coolant. For example, when the increase speed of the temperature of the coolant is relatively slow but the temperature of the coolant increases continuously increased for a predetermined time, so that even when the increase width of the temperature of the coolant is increased to have a value equal to or greater than a predetermined value, the fuel cell controller 16 may operate the electronic valve 20 to open the pillar neck 13 of the radiator 12 and prevents over pressure of the cooling system.

The fuel cell controller 16 may open and close the pillar neck 13 of the radiator 12 by controlling the operation of the electronic valve 20 based on a signal of the coolant temperature sensor 14, such that over pressure of the cooling system and leakage of the stack may be effectively prevented by detecting a change in a temperature of the coolant before an expansion of a volume of the coolant or elevations in the pressure and opening the electronic valve 20 in advance.

As such, according to various exemplary embodiments of the present invention, over pressure of the cooling system may be prevented from being generated by adjusting the amount of opening the valve in response to a change in a temperature of the coolant, which may be a cause of a change in pressure of the cooling system before over pressure of the coolant is generated in advance. In addition, deterioration of efficiency in cooling the stack caused due to a decrease in the operation speed of the coolant pump when over pressure of the cooling system is generated in the related art may be reduced.

Further, the electronic valve 20 may be controlled according to information of the temperature sensor in real time through real-time monitoring of the coolant temperature sensor 14 by the fuel cell controller 16, thereby rapidly and accurately controlling the increase in the pressure of the coolant.

The electronic valve 20 may be mechanically opened by external pressure greater than pressure specification of the positive pressure spring 24 of the electronic valve 20 by expanding volume according to the increase in the temperature of the coolant, thereby maintaining and controlling the operative pressure of the coolant.

As shown in FIG. 1, a three-way valve 17 may be installed at an outlet of the radiator 12 and may control a flow of the coolant, and a COD heater 18 may be disposed between the coolant pump 11 and the stack 10 and may heat a coolant supplied to the stack 10.

Figure 4:
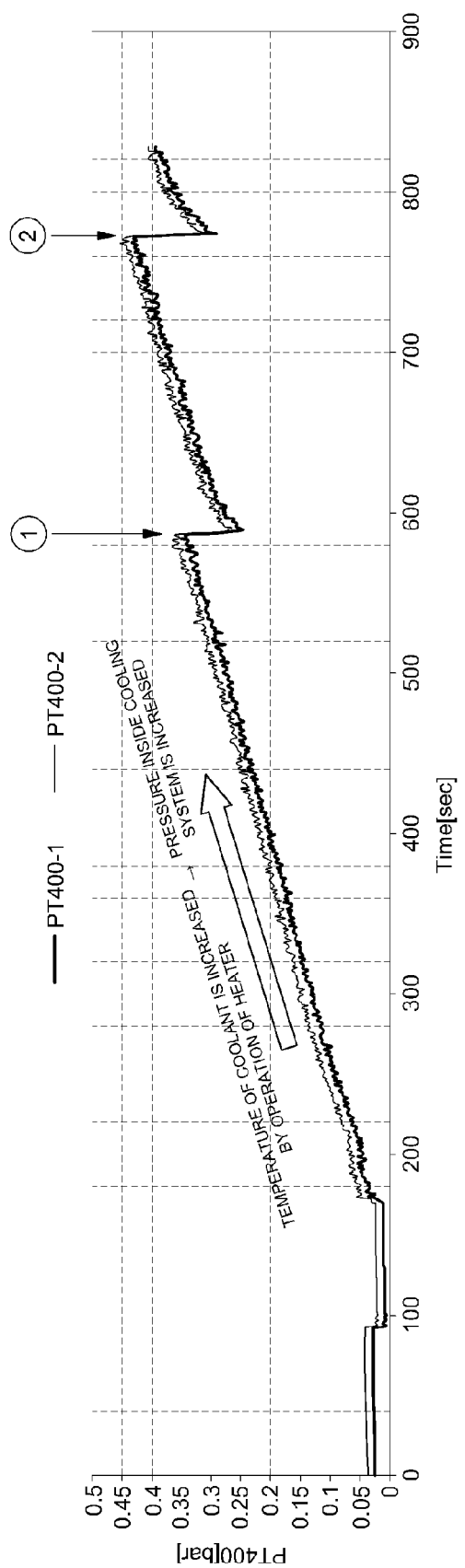
FIG. 4 is an exemplary graph illustrating an exemplary operation test result of an exemplary electronic valve according to an exemplary embodiment of the present invention.

In the meantime, FIG. 4 illustrates an exemplary graph illustrating an exemplary operation test result of the electronic valve according to an exemplary embodiment of the present invention. As shown in FIG. 4, when a temperature of the coolant increase by the operation of the heater and pressure inside the cooling system is elevated and no separate measure is performed, the pressure of the cooling system may be continuously elevated before the function of the pressurizing cap of the electronic valve is operated. As such, the pressure inside the cooling system may substantially decrease at the moment when the electronic valve is artificially operated to open the pillar neck of the radiator when the pressure of the cooling system is elevated (① and ② of FIG. 4).

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A device for preventing over pressure of a cooling system of a fuel cell system which includes a coolant pump for circulating a coolant to a fuel cell stack, a radiator for radiating heat absorbed in the coolant, and a temperature sensor for detecting a temperature of the coolant discharged from the fuel cell stack, comprising:
   an electronic valve mounted in a pillar neck of the radiator connected with a reservoir for supplementing a coolant to open and close the pillar neck; and
   a fuel cell controller programmed to control an operation of the electronic valve based on a signal of the temperature sensor,
   whererin when an increase speed of a temperature of the coolant is equal to or greater than a predetermined value or when a temperature of the coolant increases continuously for a predetermined time to be equal to or greater than a predetermined value, the fuel cell controller operates the electronic valve and an actuator in the electronic valve opens the pillar neck of the radiator.

2. The device of claim 1, wherein the electronic valve further comprises a positive pressure spring installed between the valve fixing part and the valve operating part to be contractible and recoverable.

3. A cooling system of a fuel cell system, comprising:
  a coolant pump configured to circulate a coolant to a fuel cell stack;
  a radiator configured to radiate heat absorbed in the coolant;
  a temperature sensor configured to detect a temperature of the coolant discharged from the fuel cell stack; and
  a device configured to prevent over pressure of the cooling system,
  wherein the device includes an electronic valve mounted in a pillar neck of the radiator connected with a reservoir to supplement a coolant to open and close the pillar neck; and a fuel cell controller programmed to operate the electronic valve based on a signal of the temperature sensor, and
  whererin when an increase speed of a temperature of the coolant is equal to or greater than a predetermined value or when a temperature of the coolant increases continuously for a predetermined time to be equal to or greater than a predetermined value, the fuel cell controller operates the electronic valve and an actuator in the electronic valve opens the pillar neck of the radiator.

4. The cooling system claim 3, wherein the electronic valve further comprises a positive pressure spring installed between the valve fixing part and the valve operating part to be contractible and recoverable.

5. A fuel cell system comprising the device of claim 1.

6. A fuel cell system comprising the cooling system of claim 3.

7. A vehicle comprising a fuel cell system of claim 5.

8. A vehicle comprising a fuel cell system of claim 6.

9. A device for preventing over pressure of a cooling system of a fuel cell system which includes a coolant pump for circulating a coolant to a fuel cell stack, a radiator for radiating heat absorbed in the coolant, and a temperature sensor for detecting a temperature of the coolant discharged from the fuel cell stack, comprising:
  an electronic valve mounted in a pillar neck of the radiator connected with a reservoir for supplementing a coolant to open and close the pillar neck; and
  a fuel cell controller programmed to control an operation of the electronic valve based on a signal of the temperature sensor;
  whererin when an increase speed of a temperature of the coolant is equal to or greater than a predetermined value or when a temperature of the coolant increases continuously for a predetermined time to be equal to or greater than a predetermined value, the fuel cell controller operates the electronic valve and an actuator in the electronic valve opens the pillar neck of the radiator;
  wherein the electronic valve comprises:
    a valve fixing part fixedly mounted to an upper end of the pillar neck of the radiator;
    an electronic actuator attached to a lower end of the valve fixing part and operating according to a signal of the fuel cell controller; and
    a valve operating part attached to a lower end of the electronic actuator and moving up and down according to an operation of the electronic actuator to open and close the pillar neck; and
    a positive pressure spring installed between the valve fixing part and the valve operating part to be contractible and recoverable,
  wherein the electronic actuator is operated by a pressure of the coolant and is extended by elastic restoration force of the positive pressure spring to be recoverable.

* * * * *